(12) United States Patent
Boeing et al.

(10) Patent No.: US 10,837,539 B2
(45) Date of Patent: Nov. 17, 2020

(54) GEARBOX-SIDE MOTOR END SHIELD

(71) Applicant: Siemens Aktiengesellschaft, Munich (DE)

(72) Inventors: Georg Boeing, Rottenburg (DE); Jens Bihr, Lauterstein-Nenningen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/469,552

(22) PCT Filed: Dec. 21, 2017

(86) PCT No.: PCT/EP2017/084019
§ 371 (c)(1),
(2) Date: Jun. 13, 2019

(87) PCT Pub. No.: WO2018/115241
PCT Pub. Date: Jun. 28, 2018

(65) Prior Publication Data
US 2019/0360576 A1    Nov. 28, 2019

(30) Foreign Application Priority Data
Dec. 22, 2016   (DE) .................... 10 2016 226 046

(51) Int. Cl.
*F16H 57/031*   (2012.01)
*H02K 7/116*    (2006.01)
(Continued)

(52) U.S. Cl.
CPC ........... *F16H 57/031* (2013.01); *F16H 1/145* (2013.01); *F16H 57/023* (2013.01);
(Continued)

(58) Field of Classification Search
CPC .......... F16H 57/021; F16H 2057/0221; F16H 57/031; F16H 2057/02034; F16H 2057/02069; H02K 7/1163
See application file for complete search history.

(56) References Cited

U.S. PATENT DOCUMENTS

| 6,029,532 A  | * | 2/2000  | Phillips ..................... F16H 1/20 74/421 A |
| 2006/0194666 A1 | | 8/2006 | Zimmermann |
| 2016/0305534 A1 | * | 10/2016 | Collins ................. F16H 57/025 |

FOREIGN PATENT DOCUMENTS

| DE | 4213203 C1  | 9/1991 |
| DE | 10312941 A1 | 12/2004 |

(Continued)

OTHER PUBLICATIONS

"PCT International Search Report and Written Opinion of International Searching Authority dated Nov. 4, 2018 corresponding to PCT International Application No. PCT/EP2017/084018 filed Dec. 21, 2017".

(Continued)

*Primary Examiner* — Thomas C Diaz
(74) *Attorney, Agent, or Firm* — Henry M. Feiereisen LLC

(57) ABSTRACT

A type series of gear-side motor end shields for an angle geared motor is disclosed, with the angle geared motor including a gear housing of an angle gear, in which a toothed wheel is mounted to rotate about a gear shaft axle, and a stator housing of an electric motor, in which stator housing a motor shaft is rotatably mounted. Each of the gear-side motor end shields includes a gear-side section for securement of the gear housing, and a motor-side section which is permanently connected to the gear-side section for securement of the stator housing. The gear-side motor end shields are configured such that each of the gear-side motor end (Continued)

shields produces a different axial offset between the gear shaft axle and an axle of the motor shaft.

4 Claims, 8 Drawing Sheets

(51) Int. Cl.
  *F16H 1/14* (2006.01)
  *F16H 57/023* (2012.01)
  *F16H 57/038* (2012.01)
  *F16H 57/02* (2012.01)

(52) U.S. Cl.
  CPC ......... *F16H 57/038* (2013.01); *H02K 7/1163* (2013.01); *F16H 2057/02034* (2013.01); *F16H 2057/02069* (2013.01); *F16H 2057/02073* (2013.01)

(56) References Cited

FOREIGN PATENT DOCUMENTS

| EP | 1045168 A2 | 10/2000 |
| WO | WO 9906743 A1 | 2/1999 |
| WO | WO 2004077644 A2 | 9/2004 |

OTHER PUBLICATIONS

"PCT International Search Report and Written Opinion of International Searching Authority datd Mar. 29, 2018 corresponding to PCT International Application No. PCT/EP2017/084019 filed Dec. 21, 2017".

"PCT International Search Report and Written Opinion of International Searching Authority dated Mar. 29, 2018 corresponding to PCT International Application No. PCT/EP2017/084020 filed Dec. 21, 2017".

* cited by examiner

US 10,837,539 B2

GEARBOX-SIDE MOTOR END SHIELD

CROSS-REFERENCES TO RELATED APPLICATIONS

This application is the U.S. National Stage of International Application No. PCT/EP2017/084019, filed Dec. 21, 2017, which designated the United States and has been published as International Publication No, WO 2018/115241 and which claims the priority of German Patent Application, Serial No. 10 2016 226 046.4, filed Dec. 22, 2016, pursuant to 35 U.S.C. 119(a)-(d).

BACKGROUND OF THE INVENTION

In principle, the term angle gear comprises all gears which allow the torque to be deflected by an angle, in particular of 90 degrees, such as bevel gears and worm gears. In this case, a distinction is made between angle gears without an axial offset and an angle gear with an axial offset. In the case of angle gears without an axial offset, the axles of the drive and driven shafts, which are at an angle to one another, intersect at an intersection point. In angle gears with an axial offset, the axles of the drive and driven shafts, which are at an angle to one another, do not have a common point of intersection, and instead they merely cross one another. Bevel gears with an axial offset are also known as hypoid gears.

With angle gears with an axial offset, for example worm and hypoid gears, the play has to be precisely set between a pinion arranged on a drive shaft and a toothed wheel arranged on a driven shaft, for example a crown gear; the tolerances are in the range of tenths of a millimeter. In the case of a worm gear, reference is made to a "contact pattern setting"; in the case of a bevel gear, reference is made to a "play setting". In the case of angle gears with an axial offset, the axial offset between the motor pinion and the toothed wheel, which is also referred to as the axial distance, is decisive for the efficiency and the possible transmission range:

With increasing axial distance (extreme case worm gear), the efficiency η (high sliding proportion in addition to rolling) decreases, but the achievable transmission range [i_min; L_max] increases (i_max to 100!).

With decreasing axial offset (extreme case bevel gear with axial offset=0), the efficiency η (decreasing sliding proportion in addition to rolling) increases, but the achievable transmission range [i_min; i_max] decreases (in the case of the bevel gear, i_min approximately 1.5 and i_max approximately 6).

Worm gears are the usual solution for angle gears, but can have the disadvantage that, due to a high sliding proportion, their efficiency is relatively low. Bevel gears without axial offset have the disadvantage that the achievable transmission range is limited. Although any desired transmission ratio could also be achieved with the "bevel gears without axial offset" gear type, namely by using a plurality of gear stages, this design would be significantly more expensive than a single-stage hypoid gear.

With hypoid gears, as in the case of bevel gears without axial offset, precise setting of the play between the toothed wheel and the pinion is decisive for the efficiency, the load-bearing capacity, the noise development and the service life of the gear. The required accuracy of the respective position of pinion and toothed wheel is at <±1/10 mm.

Angular geared motors with axial offset are used inter alia in conveying technology, for example for driving a roller conveyor for transporting piece goods such as packages, suitcases, pallets or crates.

DE10200905344A1 (SEW-Eurodrive) Aug. 5, 2010 describes an angle geared motor with what is known as helicon toothing of the pinion 1. In this case, the position of the toothed wheel 6 is set in the axial direction by inserting shim rings 518, 521 between the rolling bearing 11, 25 and the securing ring 12, 88 of the rolling bearing; as a result, the axial position of the toothed wheel can be precisely set in the range of <±1/10 mm. Subsequent setting of the position of the motor pinion in the axial direction is not necessary since the cylindrical shape of the pinion (helicon) and the planar crown gear permit a tolerance of ±5/10 mm.

The object of the present invention is to disclose an improved angle geared motor.

SUMMARY OF THE INVENTION

This object is inventively achieved by a type series of gear-side motor end shields for an angle geared motor, wherein the angle geared motor has a gear housing of an angle gear, in which a toothed wheel is mounted to rotate about a gear shaft axle, and a stator housing of an electric motor, in which a motor shaft having a pinion fastened thereto is rotatably mounted, wherein the gear-side motor end shields each have a gear-side section, to which the gear housing can be fixed, and a motor-side section, permanently connected to the gear-side section, to which the stator housing can be fixed, and wherein the gear-side motor end shields each produce a different axial offset between the gear shaft axle and the axle of the motor shaft. This invention is also inventively achieved by a gear-side motor end shield for an angle geared motor, wherein the angle geared motor has a gear housing of an angle gear, in which a toothed wheel is mounted to rotate about a gear shaft axle, and a stator housing of an electric motor, in which a motor shaft having a pinion fastened thereto is rotatably mounted, wherein the motor end shield has a gear-side section, to which the gear housing can be fixed, and a motor-side section, permanently connected to the gear-side section, to which the stator housing can be fixed, and wherein the motor end shield, in a first assembly position between the gear housing and the stator housing, produces a first axial offset between the gear shaft axle and the axle of the motor shaft and in a second assembly position between the gear housing and the stator housing, which emanates from the first assembly position by a rotation of the motor end shield about 180 degrees around the axle of the motor shaft, produces a second axial offset different from the first axial offset.

The assembly position of the gear-side motor end shield is between the gear housing and the stator housing of the electric motor. The position indication "gear-side" refers to the electric motor. The gear-side motor end shield has an interface to the gear housing as well as an interface to the stator housing. The gear-side motor end shield of an angle geared motor can therefore be replaced by a different gear-side motor end shield.

A rotation of the motor end shield about 180 degrees around the axle of the motor shaft corresponds to a rotation about 180 degrees around the plane of the motor end shield.

Angle geared motors are known which have a one-piece housing, comprising a cube-shaped housing section, in other words the actual gear housing, and a cylindrical housing section, in other words the motor shield. Since the cylindrical housing section defines the position of an electric motor, the one-piece construction specifies the position of the cylindrical housing section relative to the cube-shaped housing section and therefore the radial position of a pinion arranged on a motor shaft rotatably mounted in the electric motor in relation to a toothed wheel rotatably mounted in the cube-shaped housing section. A change in the play between the pinion and a toothed wheel rotatably mounted in the cube-shaped housing section can therefore be achieved only in that the toothed wheel is axially displaced, for example by inserting shim rings, which requires a great deal of effort. In addition, the gear and the motor cannot be separately mounted in two parallel assembly lines and then flanged to one another, and instead the motor has to be constructed around the motor shaft projecting out of the gear, in other words there is a limitation to a serial assembly line.

Angle geared motors are also known, which have a two-part housing, comprising a cube-shaped housing part forming the actual gear housing and a cylindrical housing part having a gear-side motor shield; for example, DE102012010789A1 (SEW-Eu rod rive) Dec. 5, 2013 describes such an angle gear with two housing parts. However, these known two-part angle gears do not provide different axial offsets.

The invention proposes a two-part housing: the actual gear housing and the motor shield are separated by an interface. For variation of the axial distances, only different motor end shields are used, each connected to the same types of gear and stator housings. Since the motor-side section and the gear-side section of the gear-side motor end shields of the type series are each arranged in different positions relative to each other, in other words with a different offset, the use of two different gear-side motor end shields of the type series produces angle geared motors having different axial offsets between the gear shaft axle and the axle of the motor shaft. Since different angle geared motors each having the same types of gear and stator housings can be produced, wherein only different gear-side motor end shields are used, the invention has the advantage of less stock holding.

Advantageous embodiments and developments of the invention are specified in the dependent claims.

According to a preferred embodiment of the type series, the type series comprise at least one gear-side motor end shield, which in a first assembly position produces a first axial offset and in a second assembly position, which emanates from the first assembly position due to a rotation of the motor end shield about 180 degrees around the axle of the motor shaft, produces a second axial offset different from the first axial offset. This can be a type series having just a single motor end shield, whereby two different axial offsets can nevertheless be achieved between the gear shaft axle and the axle of the motor shaft, however. The type series can, however, also comprise a plurality of gear-side motor end shields which, owing to their particular structural design, can each assume the two assembly positions that are different by 180 degrees. The gear-side motor end shield has symmetrically arranged fastening means, for example continuous drilled holes in an end plate, with which it can be fastened to the gear housing in both assembly positions, rotated by 180 degrees relative to each other. Since the motor-side section and the gear-side section are not arranged concentrically relative to each other, two different positions of the motor-side section can be produced by a 180 degree rotation about the center of the gear-side section. Conversely, two different positions of the gear-side section can be analogously produced by a 180 degree rotation about the center of the motor-side section.

BRIEF DESCRIPTION OF THE DRAWING

The invention will be explained below with reference to a plurality of exemplary embodiments with the aid of the accompanying drawings. In the drawings, in each case schematically and not to scale.

DETAILED DESCRIPTION OF PREFERRED EMBODIMENTS

Figure 1:
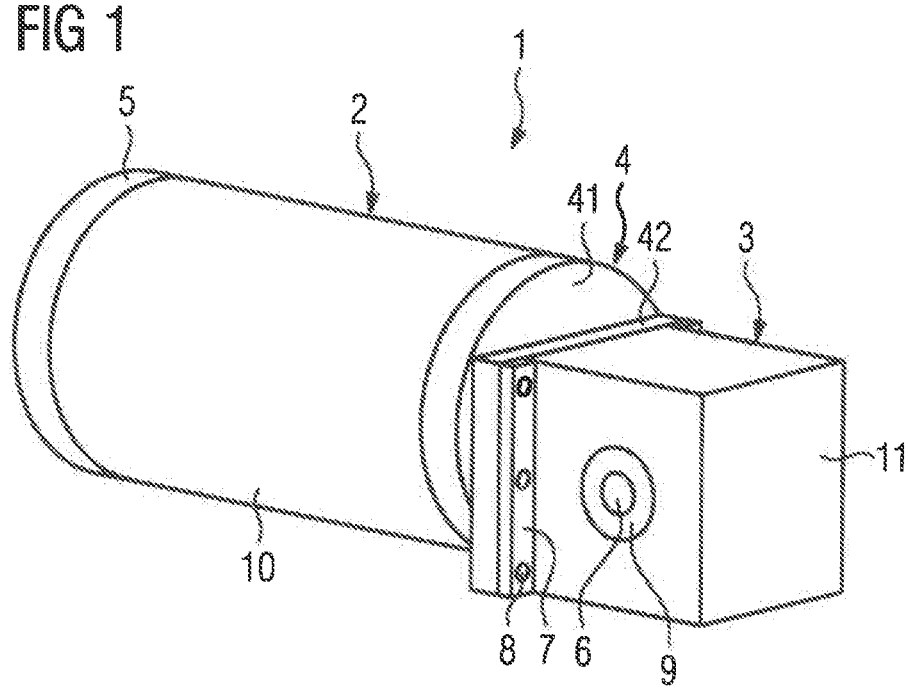
FIG. 1 shows an oblique view of a hypoid geared motor.

FIG. 1 shows an oblique view of a hypoid geared motor 1, which has an electric motor 2 and a hypoid gear 3.

The electric motor 2 has a cylindrical stator housing 10 and two motor end shields, which are mounted on the two end faces of the stator housing 10, which is also referred to as an A-side (output side) and a B-side (fan side). In this case, the A-side motor end shield 4 is located on the output side of the electric motor 2, in other words on the side facing the gear 3, and the B-side motor end shield 5 on the fan side of the electric motor 2, in other words on the side facing away from the gear 3. The A-side motor end shield 4 is therefore also referred to as a gear-side motor end shield.

The integrally formed A-side motor end shield 4 has a motor-side section 41 and a gear-side section 42. The motor-side section, which serves as a cover of the gear-side end face of the stator housing 10, has a circular circumference corresponding to the cylindrical shape of the stator housing 10. The gear-side section 42, which serves as a gear mounting plate or gear flange, has an angular circumference, corresponding to a cuboid shape of the gear housing 11.

The hypoid gear 3 has a cuboidal gear housing 11 in which a driven shaft 6 carrying a toothed wheel is mounted, and which is sealed with respect to the gear housing 11 with the aid of a shaft sealing ring 9. On two opposite sides, the gear housing 11 has in each case a flange 7 with through-holes. The two flanges 7 rest against the gear-side section 42 of the A-side motor end shield 4 and are fastened there by means of connecting bolts 8. In this case, the gear housing 11 is open on the side facing the electric motor 2 in order to allow a motor shaft of the electric motor 2 to be introduced into the gear housing 11, so a pinion mounted on the motor shaft meshes with a toothed wheel which is rotatably mounted in the gear housing 11.

Figure 2:
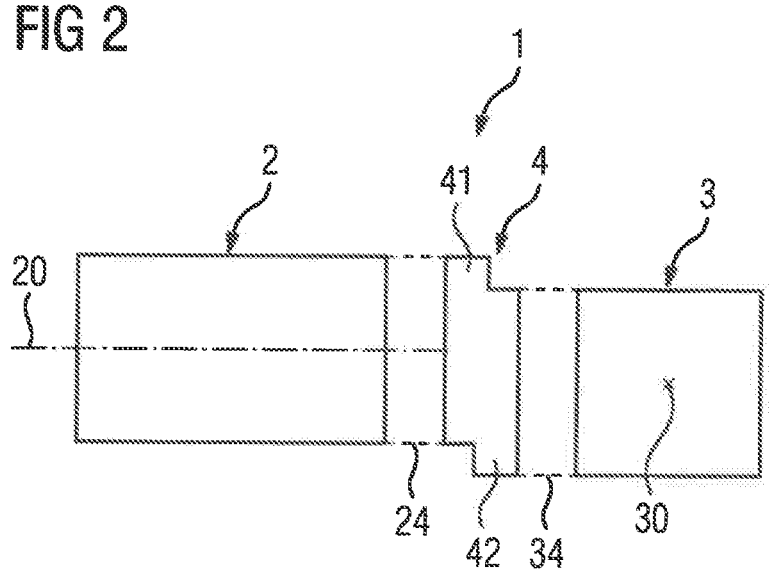
FIG. 2 shows the components of a hypoid geared motor.

FIG. 2 shows components of a hypoid geared motor 1, namely an electric motor 2 having a rotor shaft axle 20 running in the plane of the drawing, a hypoid gear 3 having a driven shaft axle 30 running perpendicular to the plane of the drawing, and an A-side motor end shield 4 arranged between the electric motor 2 and the hypoid gear 3, which has a motor-side section 41 and a gear-side section 42.

The relative assembly position of the electric motor 2 and of the A-side motor end shield 4 is indicated by the dashed lines 24; the relative assembly position of the hypoid gear 3 and of the A-side motor bearing plate 4 is indicated by the dashed lines 34.

Figure 3:
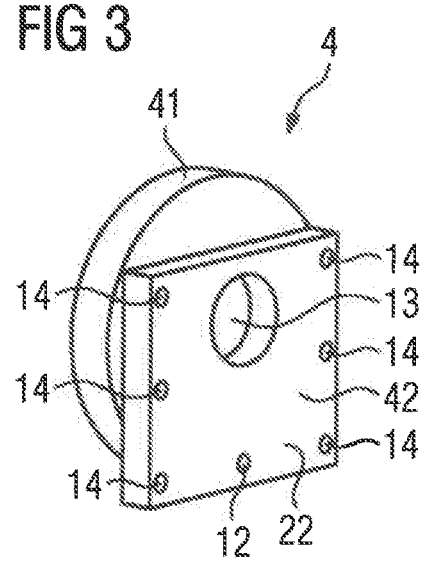
FIG. 3 shows an oblique view of a motor end shield.

FIG. 3 is an oblique view of the A-side motor end shield 4 of FIG. 1. The motor-side section 41 has fastening devices (not shown) for fastening to the stator housing 10, for example through holes for the passage of screw bolts, by means of which the A-side motor end shield 4 can be fastened to the stator housing 10. The gear-side section 42 has, along its two vertically running sides, continuous drilled holes 14 for inserting connecting bolts 8, which open out in the gear-side end face 22. The A-side motor end shield 4 can be screwed to the gear housing 11 with the aid of the continuous drilled holes 14.

The A-side motor end shield 4 has a through-opening 13 for passing through a motor shaft of the electric motor 2.

The gear-side section 42 has, at the lower edge of its gear-side end face 22, in the center of the bottom-side horizontal edge, a pin hole 12, in other words a through- or blind hole for inserting a pin. The function of the pin hole will be explained in more detail in FIG. 4.

Figure 4:
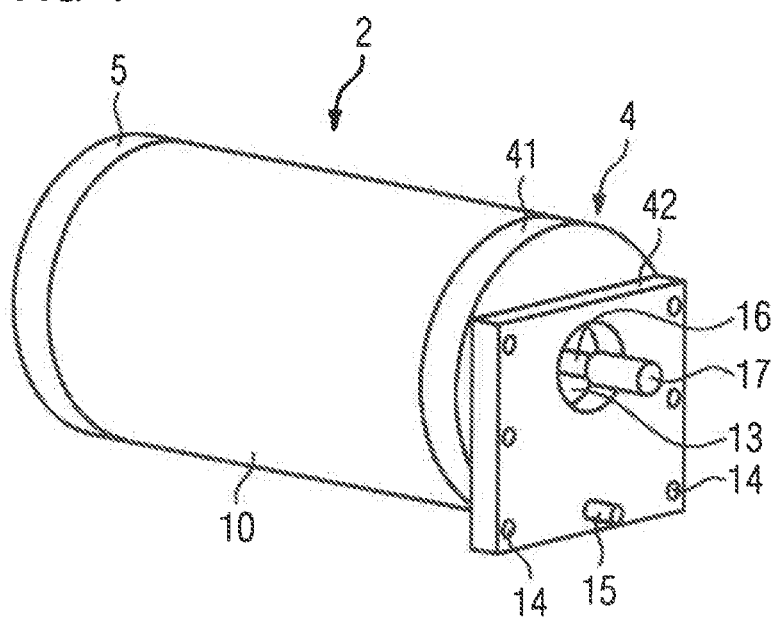
FIG. 4 shows an oblique view of an electric motor having a motor end shield according to FIG. 3.

FIG. 4 shows an oblique view of an electric motor 2 with an A-side motor end shield 4 according to FIG. 3. A motor shaft 16, to the end of which a pinion 17 is fastened, protrudes through the through-opening 13 of the A-side motor bearing plate 4. A pin 15 is inserted into the pin hole 12 at the lower edge of the gear-side end face 22 of the gear-side section 42 of the A-side motor bearing plate 4. It serves as a pivot point for the gear housing 11 relative to the A-side motor end shield 4. For this purpose, the pin 15 is inserted into a pin hole on the open end face of the gear housing 11 facing the electric motor 2.

Figure 5:
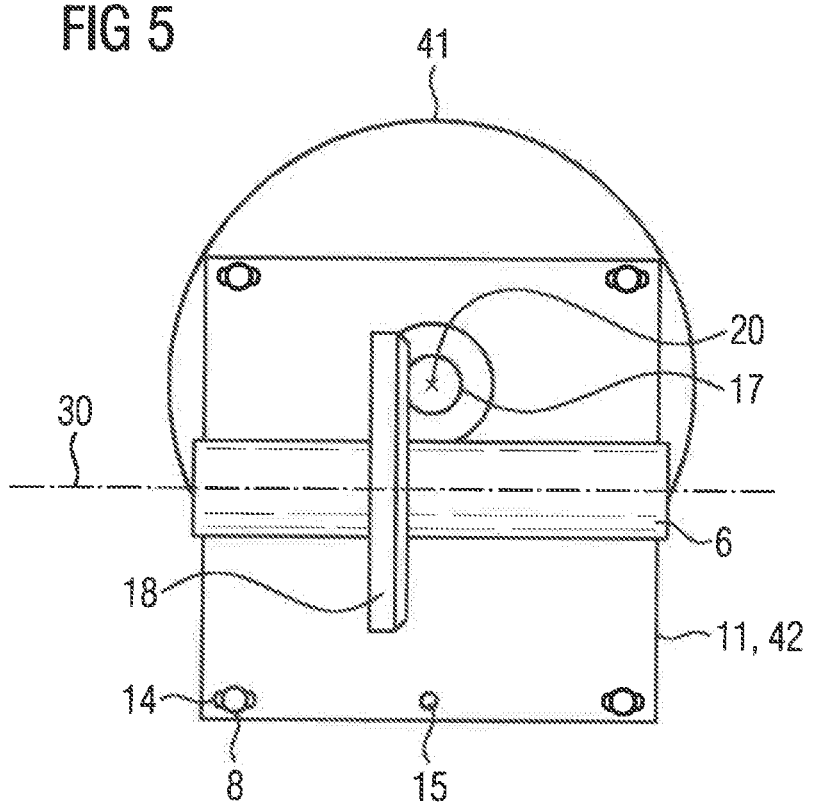
FIG. 5 shows a partially transparent view of the geared motor along the motor shaft.

FIG. 5 shows a schematic view along the axle 20 of the motor shaft, onto the A-side motor end shield 4 arranged downstream (in the viewing direction) of the gear housing 11, having the motor-side section 41 and the gear-side section 42 which is congruent with the gear housing 11. In this case, the gear housing 11 can be rotated about the pin 15, which is inserted both in a pin hole in the gear-side section 42 of the A-side motor end shield 4 and in a pin hole of the gear housing 11, as a pivot point with respect to the gear-side section 42 of the A-side motor end shield 4. The relative rotation is set in such a way that the pinion 17 meshes with a defined amount of play with the toothed wheel 18 of the hypoid gear, which is rotatably mounted about the shaft axle 30, a crown gear. In the defined relative position, the connecting bolts 8, which are guided through continuous drilled holes 14, which allow a rotation, of the gear housing 11 formed as elongated holes, are tightened, and therefore the desired position between the gear housing 11 and the A-side motor end shield 4 is secured.

Figure 6:
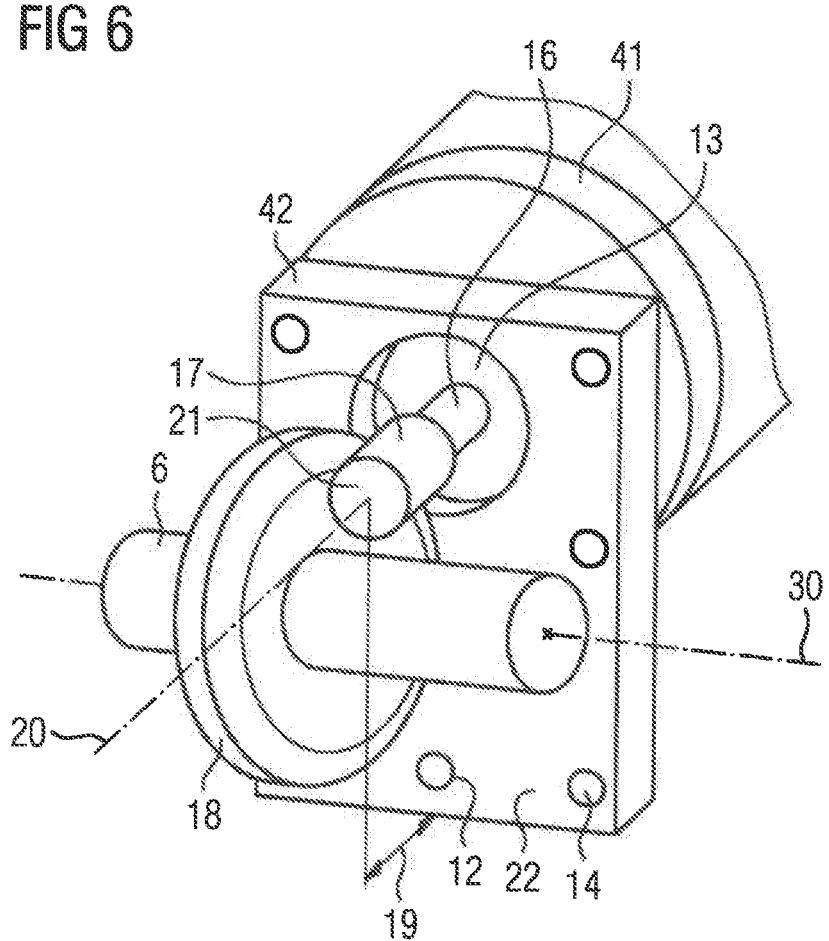
FIG. 6 shows an oblique view of a pinion meshing with a crown gear.

FIG. 6 shows an oblique view of a pinion 17 which meshes with a crown gear 18. The motor shaft 16, which protrudes through a through-opening 13 in the A-side motor end shield 41, 42, carries a pinion 17 at its tip, which meshes with a crown gear 18 which is mounted so as to be rotatable about the driven shaft 6 perpendicularly to the motor shaft 16. For defined axial positioning of the pinion 17 on the motor shaft 16, the end face 22 of the gear-side section 42 of the A-side motor end shield 41, 42 is selected as a reference plane. In this case, the pinion 17 is pressed into the motor shaft 16 until a defined distance 19 between the pinion 17, for example the end face 21 of the pinion 17, and the A-side motor end shield 41, 42, for example the end face 22 of the gear-side section 42 of the A-side motor end shield 41, 42 is achieved.

Figure 7:
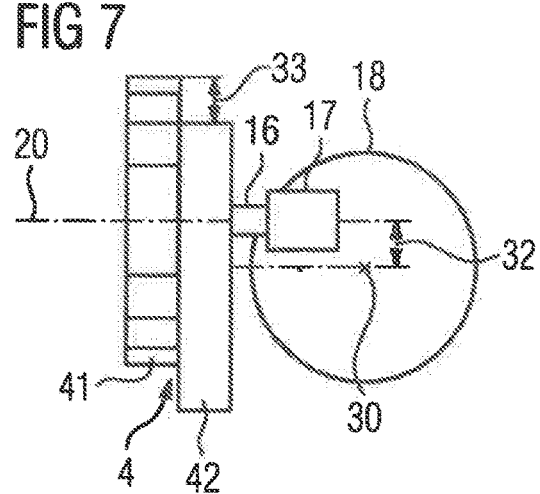
FIGS. 7 to 9 show a type series having three different motor end shields.
Figure 8:
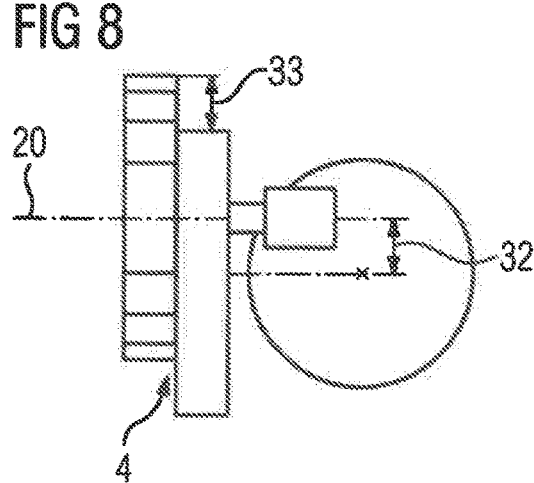
Figure 9:
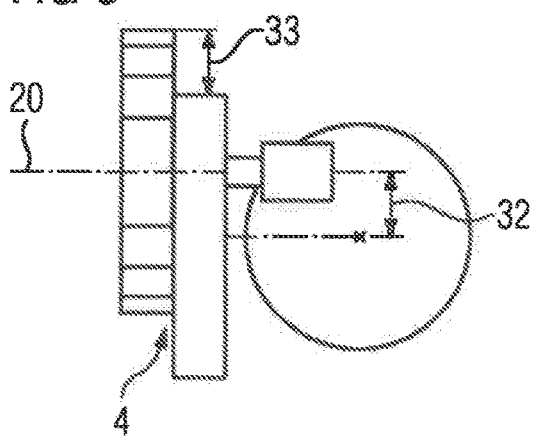

FIGS. 7 to 9 show three different A-side motor end shields 4, which form a type series. The A-side motor end shields 4 differ in that the height offset 33 between the motor-side section 41 and the gear-side section 42 of FIGS. 7 to 9 increases. On the one hand, the bearing of the motor shaft 16 and therefore the positions of the motor shaft axle 20 and of the pinion 17 remain unchanged with respect to the motor-side section 41. On the other hand, the positions of the driven shaft axle 30 and of the toothed wheel 18 remain unchanged with respect to the gear-side section 42. Consequently, the above-mentioned variation in the height offset 33 between the motor-side section 41 and the gear-side section 42 leads to a corresponding variation of the position of the pinion 17 with respect to the toothed wheel 18, in other words to a corresponding variation of the axial offset 32.

Figure 10:
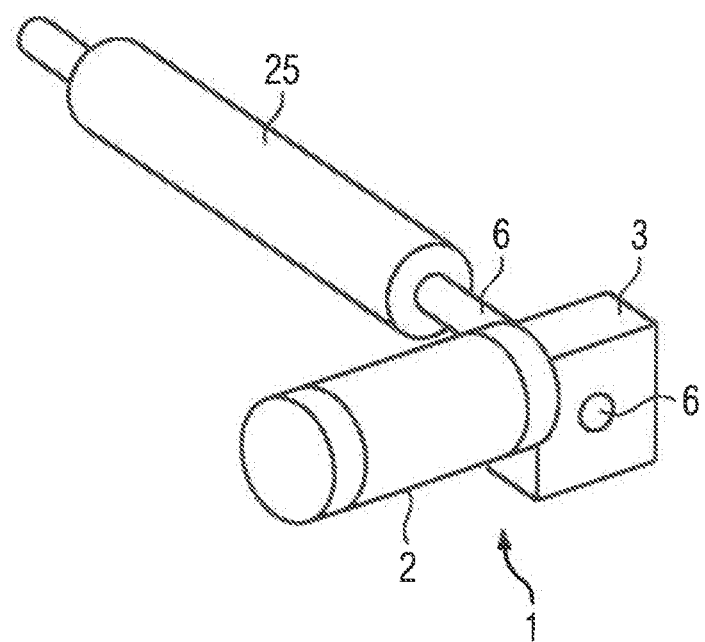
FIG. 10 shows a hypoid geared motor as a drive for a working machine.

FIG. 10 shows an angle geared motor 1, having an electric motor 2 and an angle gear 3 connected thereto. The rapid rotation of a motor shaft of the electric motor 2 is converted by the angle gear 3 into a slower rotation of a driven shaft 6 of the angle gear 3, rotated by 90 degrees. The driven shaft 6 of the angle gear 3 is connected in a rotationally fixed manner to a drive roller 25 of a roller track, for transporting piece goods such as packages, suitcases, pallets or crates.

Figure 11:
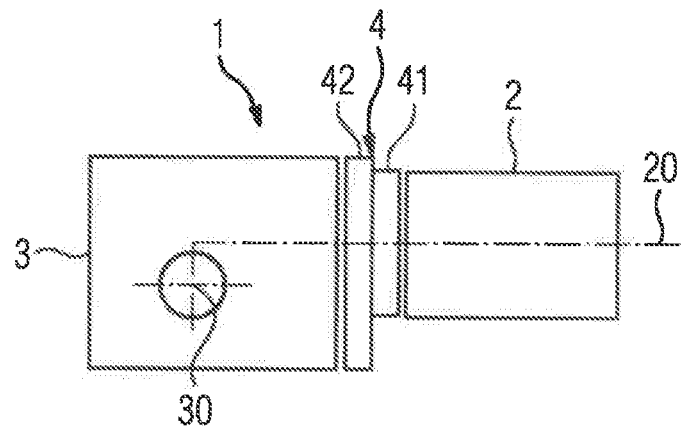
FIG. 11 shows a side view of a hypoid geared motor having a first, larger axial offset.

FIG. 11 shows a side view of a hypoid geared motor 1, comprising an electric motor 2 and an angle gear 3 connected to the electric motor 2, having a first, larger axial offset between a shaft axle 2 of the electric motor 2 and a shaft axle 30 of the angle gear 3. In this case, the gear-side motor end shield 4 of the electric motor 2, comprising a circular motor-side section 41 and a rectangular gear-side section 42, which according to its function is also referred to as a gear mounting plate, is arranged in a first assembly orientation.

Figure 13:
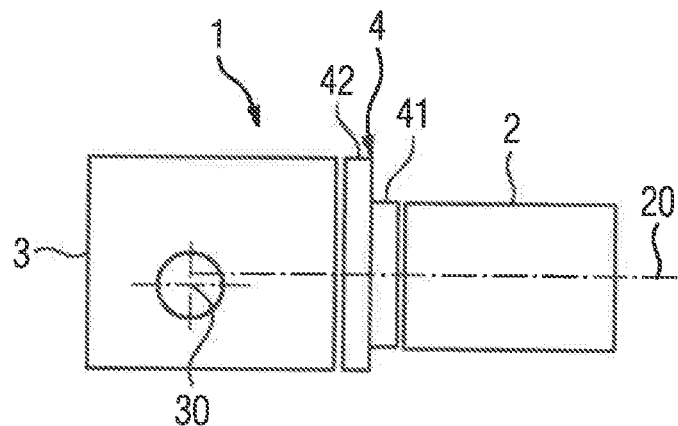
FIG. 13 shows a side view of a hypoid geared motor having a second, smaller axial offset.

FIG. 13 shows a side view of a second hypoid geared motor 1, which differs from the hypoid geared motor 1 of FIG. 11 only insofar as the gear-side motor end shield 4 is arranged in a second assembly orientation. In this case, the second assembly orientation results from the first assembly orientation by a rotation of the gear-side motor end shield 4 in the end shield plane by 180 degrees.

Figure 12:
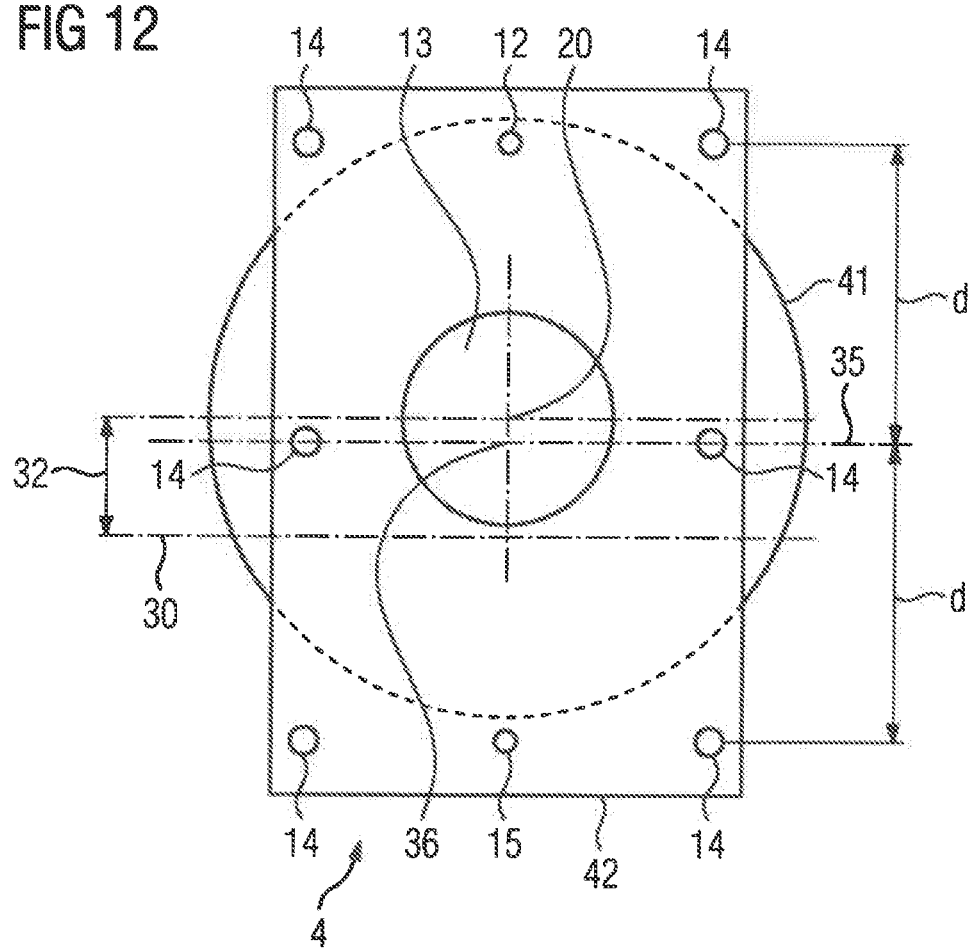
FIG. 12 shows a plan view of the gear mounting plate according to FIG. 11.

FIG. 12, which shows a plan view of the gear mounting plate 4 according to FIG. 11, represents the first assembly orientation of the gear-side motor end shield 4. In the plan view, the circular motor-side section 41 of the gear-side motor end shield 4 can also be seen partially concealed by the gear mounting plate 4.

The gear mounting plate 42 of the gear-side motor end shield 4 has six continuous drilled holes 14 along its circumference, with the hole pattern of the continuous drilled holes 14 being symmetrical with respect to a line of symmetry 35.

In each case, three drilled holes 14 are arranged at a distance d from one another equidistantly along a longitudinal side. Centrally arranged on the narrow sides of the gear mounting plate 42 between two drilled holes 14 is in each case a pin hole 12. A pin 15 is inserted into the lower pin hole 12.

The through-opening 13 of the gear-side motor end shield 4, whose center point lies on the shaft axle 20 of the electric motor 2, is offset with respect to the shaft axle 30 of the gear 3 by a first, larger axial distance 32. In this case, the line of symmetry 35 of the hole pattern runs between the shaft axle 20 of the electric motor 2 and the shaft axle 30 of the gear 3.

Figure 14:
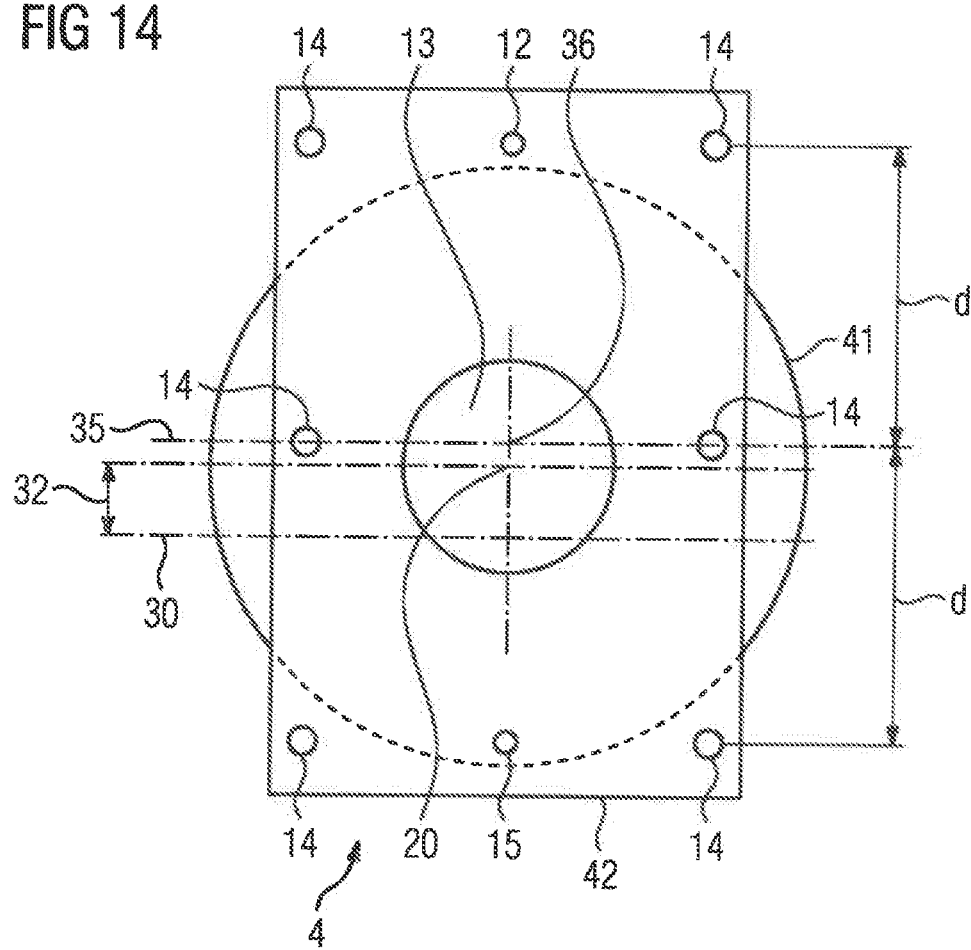
FIG. 14 shows a plan view of the gear mounting plate according to FIG. 13.

FIG. 14, which shows a plan view of the gear mounting plate 4 according to FIG. 13, represents the second assembly orientation of the gear-side motor end shield 4, which results from the first assembly orientation shown in FIG. 12 by a rotation of the gear-side motor end shield 4 in the end shield plane or about the shaft axle 20 of the motor 2 by 180 degrees.

The second assembly orientation illustrated in FIG. 14 differs from the first assembly orientation illustrated in FIG. 12 in that the through-opening 13 of the gear-side motor end shield 4, whose center point lies on the shaft axle 20 of the electric motor 2, is offset by a second, smaller axial distance 32 with respect to the shaft axle 30 of the gear 3 and the shaft axle 20 of the electric motor 2 between the line of symmetry 35 of the hole pattern and the shaft axle 30 of the gear 3.

The invention claimed is:

1. A kit of gear-side motor end shields for an angle geared motor, said angle geared motor comprising a gear housing of an angle gear, in which a toothed wheel is mounted to rotate about a gear shaft, axle, and a stator housing of an electric motor, in which stator housing a motor shaft is rotatably mounted, each of the gear-side motor end shields comprising:
   a gear-side section for securement of the gear housing; and
   a motor-side section permanently connected to the gear-side section for securement of the stator housing,
   wherein the gear side motor, end shields are configured such that each of the gear-side motor end shields produces a different axial offset between the gear shaft axle and an axle of the motor shaft,
   wherein at least one of the gear-side motor end shields is configured to produce a first axial offset in a first assembly position and a second axial offset in a second assembly position when the motor end shield is rotated by about 180 degrees around the axle of the motor shaft, said second axial offset being different from the first axial offset.

2. The kit of claim 1, wherein the toothed wheel meshes with a pinion fastened to the motor shaft.

3. A gear-side motor end shield for an angle geared motor, said angle geared motor comprising a gear housing of an angle gear, in which a toothed wheel is mounted to rotate about a gear shaft axle, and a stator housing of an electric motor, in which stator housing a motor shaft is rotatably mounted, said gear-side motor end shield comprising:
   a gear-side section for securement of the gear housing; and
   a motor-side section permanently connected to the gear-side section for securement of the stator housing,
   wherein the gear-side motor end shield is configured to produce a first axial offset between the gear shaft axle and an axle of the motor shaft in a first assembly position between the gear housing and the stator housing, and to produce a second axial offset between the gear shaft axle and the axle of the motor shaft in a second assembly position between the gear housing and the stator housing when the motor end shield is rotated by about 180 degrees around the axle of the motor shaft, said second axial offset being different from the first axial offset.

4. The gear-side motor end shield of claim 3, wherein the toothed wheel meshes with a pinion fastened to the motor shaft.

* * * * *